(12) United States Patent
Singer

(10) Patent No.: US 7,891,978 B2
(45) Date of Patent: Feb. 22, 2011

(54) SEARCH AND RESCUE TRAINING SIMULATOR

(75) Inventor: Brian P. Singer, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1807 days.

(21) Appl. No.: 11/034,599

(22) Filed: Jan. 13, 2005

(65) Prior Publication Data

US 2006/0154219 A1    Jul. 13, 2006

(51) Int. Cl.
*G09B 19/00* (2006.01)

(52) U.S. Cl. .......................... 434/219; 434/30

(58) Field of Classification Search ............... 434/1–11, 434/21–69, 219; 342/169–170; 701/3
See application file for complete search history.

(56) References Cited

U.S. PATENT DOCUMENTS

| | | | | |
|---|---|---|---|---|
| 2,321,799 | A | * | 6/1943 | Cone, Jr. et al. ............. 434/243 |
| 3,906,643 | A | * | 9/1975 | McClung ..................... 434/243 |
| 5,317,689 | A | | 5/1994 | Nack et al. |
| 5,823,780 | A | | 10/1998 | Arye et al. |
| 6,011,581 | A | | 1/2000 | Swift et al. |
| 6,500,008 | B1 | | 12/2002 | Ebersole et al. |
| 6,985,091 | B2 | * | 1/2006 | Price .......................... 340/975 |
| 2003/0128123 | A1 | | 7/2003 | Sumiya et al. |

OTHER PUBLICATIONS

Larkin, L.J.; Thomsen, C.J.; "Simulation Validation for a Unmanned Semi-Submesible Vehicle"; Oceans; vol. 3, pp. 1431-1436.*
NPL—IGN Search and Recue 3—PC—Gamespy, retrieved from http://pc.gamespy.com/pc/search-and-rescue-3/.*

* cited by examiner

*Primary Examiner*—Xuan M Thai
*Assistant Examiner*—Timothy Musselman
(74) *Attorney, Agent, or Firm*—Schmeiser, Olsen & Watts; Arthur J. Samodovitz

(57) ABSTRACT

A search and rescue training simulator and method. The training simulator comprises a first generating means, a second generating means, a third generating means, and a fourth generating means. The first generating means generates a simulated vehicle in motion performing a search and rescue function. The simulated vehicle includes a vehicular control panel. The second generating means generates a simulated environment. The third generating means generates a simulated receiver apparatus within the vehicular control panel. The fourth generating means generates a simulated transmitter apparatus within the simulated environment. The simulated transmitter apparatus is adapted to generate and transmit a signal. The simulated receiver apparatus is adapted to receive the signal and assist a user in locating the simulated transmitter apparatus in the simulated environment.

35 Claims, 6 Drawing Sheets

SEARCH AND RESCUE TRAINING SIMULATOR

BACKGROUND OF THE INVENTION

1. Technical Field

The present invention relates to a search and rescue training simulator and method.

2. Related Art

Preparing rescue crews for real life rescue missions requires training which may be difficult and costly. Therefore there is a need to provide an easy low cost way for preparing rescue crews for real life rescue missions.

SUMMARY OF THE INVENTION

The present invention provides a training simulator, comprising, comprising:
first generating means for generating a simulated vehicle in motion performing a search and rescue function, wherein said simulated vehicle comprises a vehicular control panel;
second generating means for generating a simulated environment;
third generating means for generating a simulated receiver apparatus within the vehicular control panel; and
fourth generating means for generating a simulated transmitter apparatus within the simulated environment, wherein said simulated transmitter apparatus is adapted to generate and transmit a signal, wherein said simulated receiver apparatus is adapted to receive said signal and assist a user in locating said simulated transmitter apparatus in said simulated environment.

The present invention provides a training simulation method, comprising:
providing a training simulator comprising a simulated vehicle in motion performing a search and rescue function within a simulated environment, a simulated receiver apparatus within the simulated vehicle, and a simulated transmitter apparatus within the simulated environment;
transmitting by said simulated transmitter apparatus, a signal;
receiving by said simulated receiver apparatus, said transmitted signal; and
assisting by said signal and said simulated receiver apparatus, a user in locating said simulated transmitter apparatus in said simulated environment.

The present invention provides a method for deploying computing infrastructure, comprising integrating computer-readable code comprising a training simulator into a computing system, wherein the code in combination with the computing system is capable of performing the steps of:
providing within the training simulator, a simulated vehicle in motion performing a search and rescue function within a simulated environment, a simulated receiver apparatus within the simulated vehicle, and a simulated transmitter apparatus within the simulated environment;
transmitting by the simulated transmitter apparatus, a signal;
receiving by the simulated receiver apparatus, said transmitted signal; and
assisting by said signal and said simulated receiver apparatus, a user in locating said simulated transmitter apparatus in a simulated environment.

The present invention provides a computer system comprising a processor and a computer readable memory unit coupled to the processor, said memory unit containing instructions that when executed by the processor implement a training simulator method, said method comprising the computer implemented steps of:
providing within the training simulator, a simulated vehicle in motion performing a search and rescue function within a simulated environment, a simulated receiver apparatus within the simulated vehicle, and a simulated transmitter apparatus within the simulated environment;
transmitting by a simulated transmitter apparatus, a signal;
receiving by a simulated receiver apparatus, said transmitted signal; and
assisting by said signal and said simulated receiver apparatus, a user in locating said simulated transmitter apparatus in a simulated environment.

The present invention provides advantageously provides a system and associated method to provide an easy low cost way for preparing rescue crews for real life rescue missions.

DETAILED DESCRIPTION OF THE INVENTION

Figure 1:
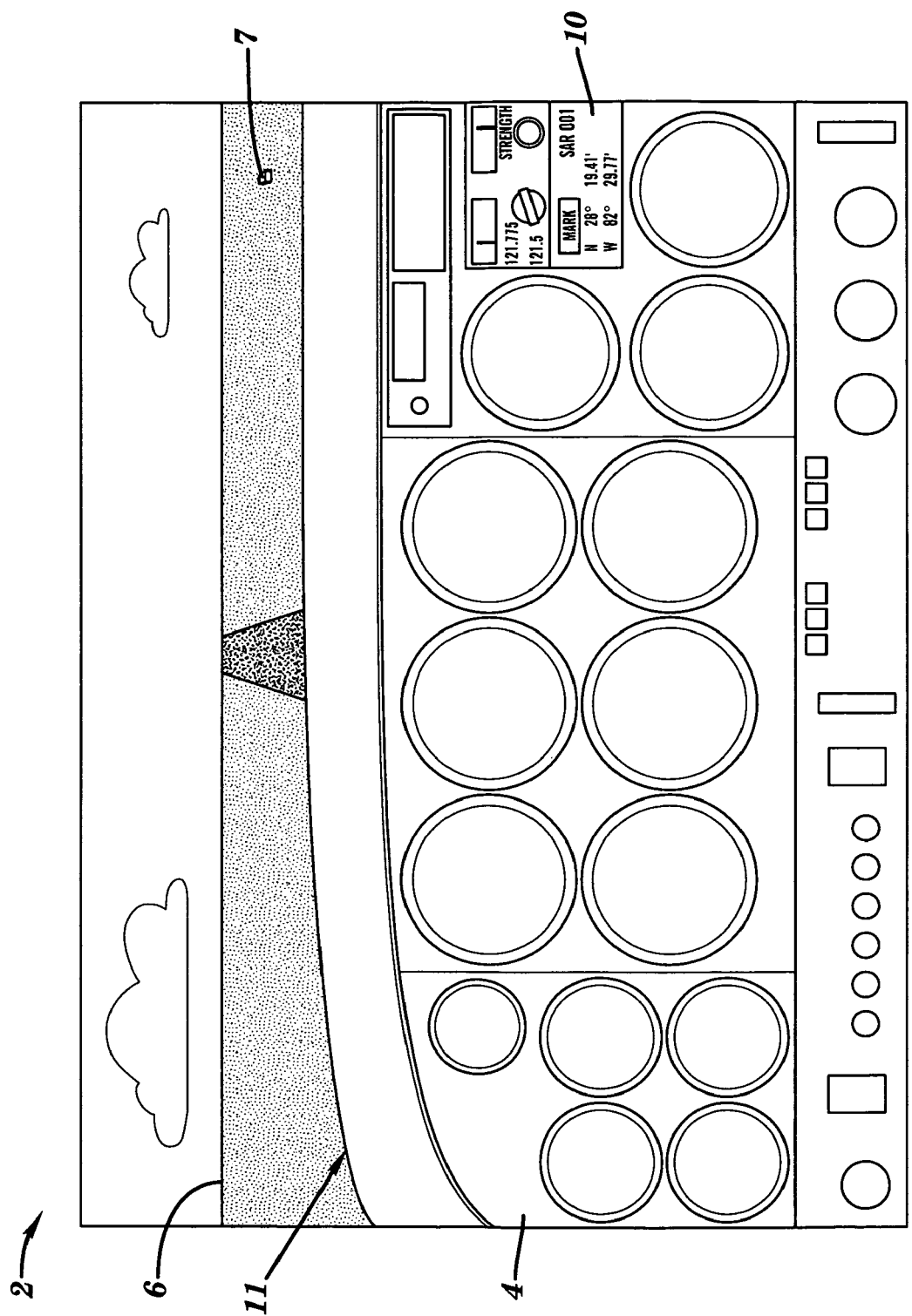
FIG. 1 illustrates an aircraft search and rescue simulator, in accordance with embodiments of the present invention.

FIG. 1 illustrates an aircraft search and rescue simulator 2, in accordance with embodiments of the present invention. Although the FIG. 1 is described with reference to an aircraft (e.g., airplane, helicopter, etc.), note that the simulator 2 may comprise any transportation means including, inter alia, an automobile, a boat, a person on foot, etc. The simulator 2 simulates a search and rescue operation and is used for training aircrews to perform a real search and rescue operation. The simulator 2 comprises a first person view (i.e., from a pilot's view). The simulator 2 may be implemented in software, hardware, or any combination thereof. For example, a computer program on a computer may control simulator 2 functions and provide the first person view on a monitor. The simulator 2 comprises a simulated aircraft dash panel 4 within a simulated aircraft 11, a simulated environment 6, a simulated receiver apparatus 10, and a simulated transmitter apparatus 7. The simulator 2 provides a realistic first-person (as seen from the pilot's perspective), full-function, search simulator for training aircrews to perform a search and rescue operation under an unlimited number of conditions (e.g., weather conditions, terrain conditions, etc.). A search and rescue operation is defined herein as an operation to locate and rescue a person in distress. For example, a person lost in their surroundings (e.g., woods, in a body of water, on a mountain), a person in a downed aircraft or any disabled transportation means, a military rescue operation, etc. The simulator 2 comprises a simulated receiver apparatus 10 within the simulated aircraft dash panel 4 and a simulated transmitter apparatus 7 hidden from view 9 (i.e., from a user) within the simulated environment 6. The simulated transmitter apparatus 7 may simulate an emergency locator transmitter (ELT), inter alai, an emergency locator transmitter. An ELT is defined herein as a device that when activated continually broadcasts a signal on 121.5 MHz indicating that a person, aircraft or boat is in distress. The signal is detected by satellites and an air force rescue coordination center dispatches a search and rescue (SAR) aircraft in the general area to pinpoint the signal, and direct a ground team to the precise location of the ELT. The simulated receiver apparatus 10 may simulate, inter alia, an aircraft direction finding (DF) apparatus used for locating an ELT. Upon enabling the simulator 2 (i.e., turning on the simulator 2 to simulate and practice a search and rescue operation), the simulated transmitter apparatus 7 transmits a continuous signal that is received by the simulated receiver apparatus 10. The signal may be, inter alia, an audio signal. A user (i.e., a person training to perform a search and rescue operation) of the simulator 2 uses the simulated receiver apparatus 10 to aid in locating the simulated transmitter apparatus 7. There are many methods that may be employed for using the simulated receiver apparatus 10 to locate the simulated transmitter apparatus 7 as described with reference to FIGS. 3, 4, and 5. A detailed description of the simulated receiver apparatus 10 is described with reference to FIG. 2.

Figure 2:
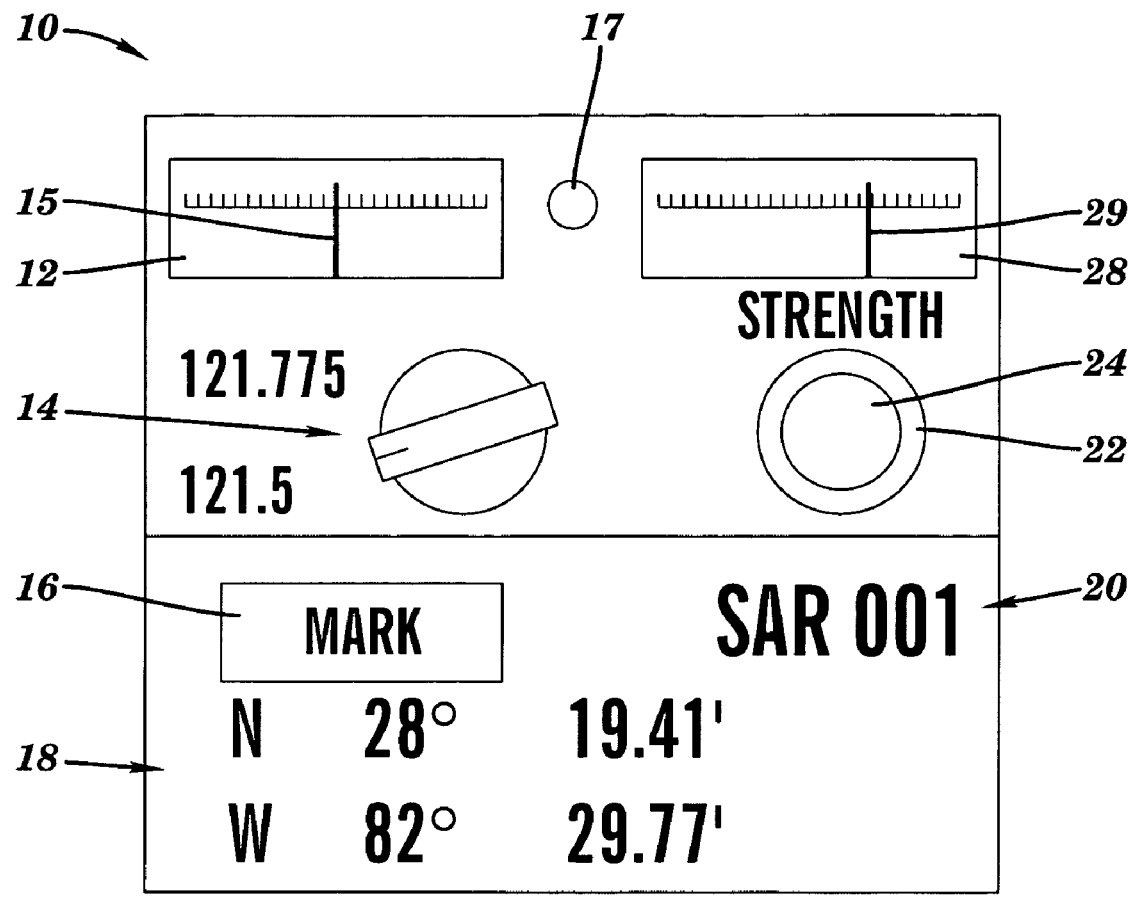
FIG. 2 illustrates a detailed view of the simulated receiver apparatus of FIG. 1, in accordance with embodiments of the present invention.

FIG. 2 illustrates a detailed view of the simulated receiver apparatus 10 of FIG. 1, in accordance with embodiments of the present invention. The simulated receiver apparatus 10 (e.g., a DF apparatus) comprises a left/right indication gauge 12 comprising a left/right indication needle 15, a frequency selection knob 14, a waypoint "mark" activation button 16, a way point latitude/longitude indicator 18, an on/off indicator 17, a signal strength gauge 28 w/needle 29, an on/off activation button 24, a sensitivity adjustment knob 22, and a way point ID number 20. The left/right indication gauge 12 comprising the left/right indication needle 15 provides a left/right direction indicator for the simulated aircraft 11 in relation to the simulated transmitter apparatus 7. For example, if the needle 15 is centered on the gauge 12 as shown in FIG. 2, this indicates that the simulated transmitter apparatus 7 is located either directly in front of or directly in back of the simulated aircraft 11. Dependent upon a location of the simulated aircraft 11 in relation to the simulated transmitter apparatus 7 the left/right indication needle 15 will move to the left or the right and a user may use the left/right indication needle 15 to help guide the simulated aircraft 11 towards the simulated transmitter apparatus 7 (i.e., by attempting to center the needle 15). If the simulated transmitter apparatus 7 is located in front of the simulated aircraft 11 (i.e., simulated transmitter apparatus 7 positioned 90° or less to the left or right from front of simulated aircraft 11) the needle 15 will move in a direction that is opposite to a direction that the simulated aircraft 11 is turning as the simulated aircraft 11 is turning towards the simulated transmitter apparatus 7. Likewise if the simulated transmitter apparatus 7 is located behind the simulated aircraft 11 (i.e., simulated transmitter apparatus 7 positioned greater than 90° to the left or right from front of simulated aircraft 11) the needle 15 will move in a direction that is the same as a direction that the simulated aircraft 11 is turning as the simulated aircraft 11 is turning towards the simulated transmitter apparatus 7. The needle 15 will react differently depending on signal strength of the signal from the simulated transmitter apparatus 7 and relative location of the simulated transmitter apparatus 7 in relation to the simulated aircraft 11.

The frequency selection knob 14 allows a user to select a broadcast frequency (i.e., a frequency that the simulated transmitter apparatus 7 is broadcasting over) for the simulated receiver apparatus 10. As an example, the broadcast frequency may be selected from a range of about 121 MHz to about 122 MHz. The way point "mark" activation button 16 updates a current latitude and longitude for the simulated aircraft 11. Additionally the way point "mark" activation button 16 increments a search and rescue way point ID number. The way point latitude/longitude indicator 18 indicates the aircraft 11 latitude and longitude when the way point "mark" activation button 16 is activated. The way point latitude/longitude indicator 18 is used when the simulated transmitter apparatus 7 is located. The way point latitude/longitude obtained from the way point latitude/longitude indicator 18 may be radioed to a ground rescue team or a mission base as necessary. The on/off indicator 17 indicates on/off function for the simulated receiver apparatus 10. The on/off indicator 17 may additionally be used to indicate a simulated transmitter apparatus 7 failure thereby adding realistic search and rescue complications to the simulator 2. The signal strength gauge 28 indicates how strong the simulated transmitter apparatus 7 signal is being received by the aircraft's 11 antenna. Additionally signal strength gauge 28 indicates how much the simulated transmitter apparatus 7 signal is boosted or lowered by the sensitivity adjustment knob 22. Over or under sensing the simulated transmitter apparatus 7 signal will cause the left/right indication needle 15 to drift toward the center. The on/off activation button 24 turns the simulated receiver apparatus 10 on or off. The sensitivity adjustment knob 22 is used to adjust a sensitivity of the simulated transmitter apparatus 7 signal (i.e., boosts or lowers signal strength) in a case where the signal strength is to low or too high, respectively, giving the user an inaccurate signal strength reading. The way point ID number 20 is a gauge for a way point ID number.

The simulated receiver apparatus 10 may be programmed to simulate various search and rescue conditions that may be encountered by a search and rescue team. Table 1 illustrates some examples of simulated search and rescue conditions.

TABLE 1

| Simulated Condition | Description |
| --- | --- |
| Normal Operation | A mission on perfect day-type training |
| Very weak simulated transmitter apparatus 7 signal | Examples: Simulated transmitter apparatus 7 battery is dying or the simulated transmitter apparatus 7 is shielded from transmission. |
| Left/right indication needle 15 is stuck in the center malfunction | Simulating a partial malfunction of the receiving apparatus 7 |
| Erratic Left/Right indication needle 15 movement | For example the simulated transmitter apparatus 7 is located near high voltage power lines. |
| Signal strength needle 29 stuck | Simulating a partial malfunction of the receiving apparatus 7 |
| Full receiving apparatus 7 malfunction | Forcing an audio only simulation |

The simulator 2 may be used to simulate several techniques for locating the simulated transmitting apparatus 7. For example:

It may be determined that the simulated aircraft 11 is moving toward or moving away from the simulated transmitter apparatus 7 by playing "hot and cold" with the transmitted signal. The simulated aircraft 11 is maneuvered towards the simulated transmitter apparatus 7 as the transmitted signal becomes stronger.

Blocking the transmitted signal with a solid object (e.g., the simulated aircraft 11 wing) so that one can determine the transmitting signals general direction. The simulated aircraft's wing 11 is lifted to shadow the transmitted signal from the simulated aircraft 11 and thus it may be determined that whichever direction blocks the signal is the general direction to locate the simulated transmitting apparatus 7. This technique is known as "wing shadowing" or "wing null".

Using the frequency selection knob 14 to step off (increment or decrement) a receiving frequency receiving apparatus for receiving the transmitted signal may help to locate the simulated transmitting apparatus 7. The frequency may be stepped off by 0.05 MHz at a time so that a user may determine how much signal "bleed through" there is from one frequency to the next. The more signal "bleed through" that occurs to frequencies that are further from an original transmitting signal frequency (e.g., 121.5 MHz), the closer the transmitting signal is therefore the closer the simulated transmitting apparatus 7 is to the simulated aircraft 11. For example, if the transmitting signal is only broadcast on the original transmitting signal frequency of 121.5 MHz, then the transmitting apparatus 7 is probably far away from the receiving apparatus 10. If the transmitting signal is broadcast on 121.5 MHz and 121.55 MHz then the transmitting apparatus 7 is closer to the receiving apparatus 10. If the transmitting signal is broadcast on 121.5 MHz, 121.55 MHz, and 121.6 MHz then the transmitting apparatus 7 is even closer to the receiving apparatus 10.

Figure 3:
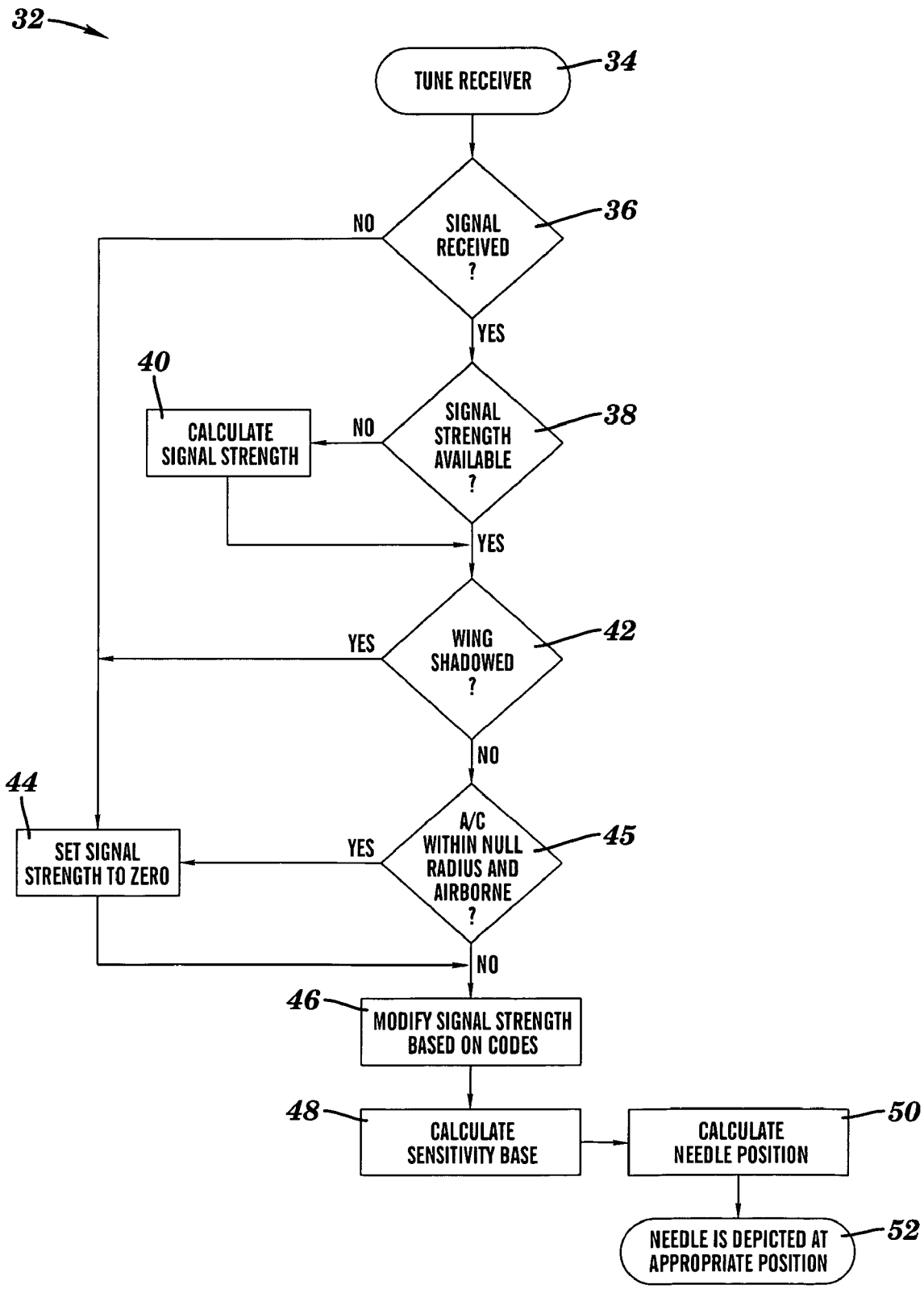
FIG. 3 is a flowchart depicting an algorithm illustrating a functionality for the signal strength gauge of FIG. 2, in accordance with embodiments of the present invention.

FIG. 3 is a flowchart depicting an algorithm 32 illustrating a functionality for the signal strength gauge 28 of FIG. 2 within the simulator 2 of FIG. 1, in accordance with embodiments of the present invention. In step 34, a user activates the simulator and tunes (e.g., using the frequency selection knob 14 of FIG. 2) a receiving apparatus to a specified receiving frequency (i.e., frequency to receive the signal being transmitted from the transmitting apparatus 7 of FIG. 1). Alternatively, the user may enter coordinates for an approximate location of the transmitting apparatus into the receiving apparatus. For example, if the simulation exercise comprises a search and rescue operation for a downed aircraft, approximate coordinates for the crash site may be entered into the receiving apparatus. Additionally, approximate coordinates may be entered into the receiving apparatus and when the simulated aircraft (e.g., see FIG. 1) reaches the approximate coordinates, the receiving apparatus may be tuned to a specified receiving frequency (i.e., frequency to receive the signal being transmitted from the transmitting apparatus 7) to assist the user in locating the transmitting apparatus. In step 36, the simulator determines whether the signal being transmitted from the transmitting apparatus is received by the receiving apparatus.

If the signal transmitted from the transmitting apparatus is not received by the receiving apparatus in step 36, then the simulator will reset itself (e.g. the signal strength gauge 28 of FIG. 2 will be reset to zero) in step 44 and in step 46 codes related to various search and rescue conditions that may be encountered by a search and rescue team (e.g., simulated missions from table 1) may be entered into the simulator to produce a signal comprising a signal strength related to a simulated mission. In step 48, a sensitivity adjustment knob (e.g., sensitivity adjustment knob 22 in FIG. 2) is used to adjust a sensitivity of the simulated transmitter apparatus signal (i.e., boosts or lowers signal strength) in a case where the signal strength is to high or too low and a sensitivity value is calculated by the simulator. In step 50, a position for a needle within a strength gauge (e.g., needle 29 and strength gauge 28 in FIG. 2) illustrating a true signal strength for the signal is determined based on the sensitivity value calculated in step 48 and a signal strength from step 46. In step 52 the needle is depicted at an appropriate position to illustrate the true signal strength.

If the signal transmitted from the transmitting apparatus is received by the receiving apparatus in step 36, then in step 38 the simulator determines if an associated value for a signal strength for the signal is available. If an associated value for the signal strength is not determined in step 38, then an associated value for the signal strength is calculated in step 40 and the simulator determines in step 42 if the signal is blocked due to wing shadowing. If an associated value for the signal strength is determined in step 38 then likewise the simulator determines if the signal is blocked due to wing shadowing in step 42.

If the signal is blocked due to wing shadowing in step 42, then the simulator will reset itself (e.g. the signal strength gauge 28 of FIG. 2 will be reset to zero) in step 44 and in step 46 codes related to various search and rescue conditions that may be encountered by a search and rescue team (e.g., simulated missions from table 1) may be entered into the simulator to produce a signal strength related to a simulated mission. In step 48, a sensitivity adjustment knob (e.g., sensitivity adjustment knob 22 in FIG. 2) is used to adjust a sensitivity of the simulated transmitter apparatus signal (i.e., boosts or lowers signal strength) in a case where the signal strength is to high or too low and a sensitivity value is calculated by the simulator. In step 50, a position for a needle within a strength gauge (e.g., needle 29 and strength gauge 28 in FIG. 2) illustrating a true signal strength is determined based on the sensitivity value calculated in step 48 multiplied by the determined signal strength in step 38 or the calculated signal strength from step 40. In step 52 the needle is depicted at an appropriate position to illustrate the true signal strength.

If the signal is not blocked due to wing shadowing in step 42, then in step 45 the simulator determines if the simulated aircraft (e.g., simulated aircraft 11 of FIG. 1) is within a null radius (i.e., the simulated aircraft fuselage is blocking the signal). If in step 45, the simulator determines that the simulated aircraft (e.g., see FIG. 1) is within a null radius, then go to steps 44, 46, 48, 50, and 52 respectively as described, supra. If in step 45, the simulator determines that the simulated aircraft (e.g., see FIG. 1) is not within a null radius, then go to steps 46, 48, 50, and 52 respectively as described, supra.

Figure 4:
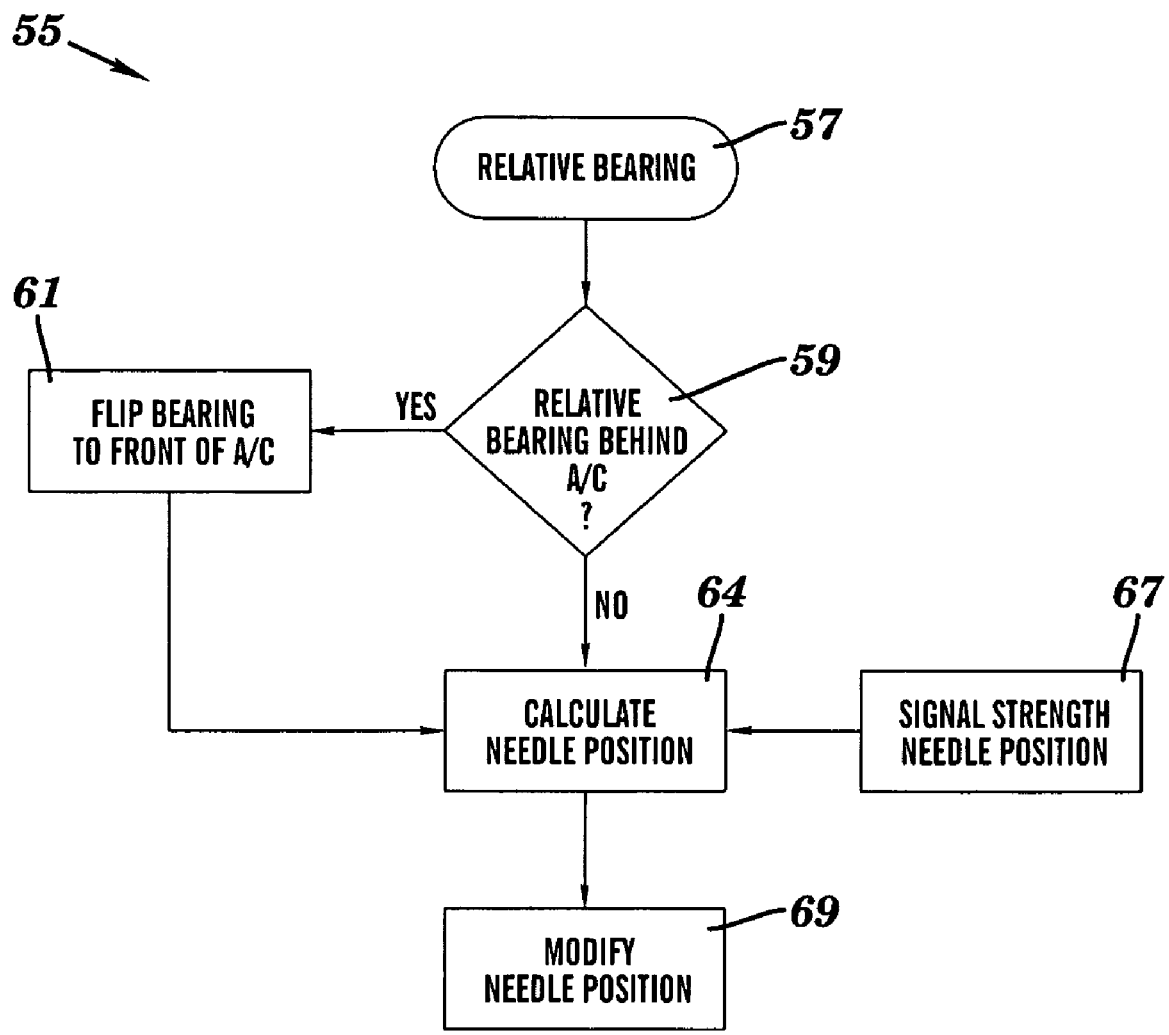
FIG. 4 is a flowchart depicting an algorithm illustrating a functionality for the left/right indication gauge of FIG. 2, in accordance with embodiments of the present invention.

FIG. 4 is a flowchart depicting an algorithm 55 illustrating a functionality for the left/right indication gauge 12 of FIG. 2 within the simulator 2 of FIG. 1, in accordance with embodiments of the present invention. In step 57, the simulator determines a relative bearing of a simulated aircraft (e.g., simulated aircraft 11 of FIG. 1) comprising a simulated receiving apparatus (e.g., simulated receiving apparatus 10 of FIG. 1) in relation to a simulated transmitting apparatus (e.g., simulated transmitting apparatus 7 of FIG. 1) by determining a signal direction from the simulated transmitting apparatus. In step 59, the simulator determines (i.e., by signal direction) if the simulated transmitting apparatus is located behind the simulated aircraft.

If in step 59 the simulated transmitting apparatus is determined to be located behind the simulated aircraft (i.e., simulated transmitter apparatus positioned greater than 90° to the left or right from front of simulated aircraft), then in step 61 the simulator reverses needle direction (i.e., so that the needle will move in a direction that is the same as a direction that the simulated aircraft is turning as the simulated aircraft is turning towards the simulated transmitter apparatus instead of the needle moving a the same direction as described in the description of FIG. 2). Reversing needle direction will allow a user to determine that the simulated transmitting apparatus is located behind the simulated aircraft. In step 64, an actual needle position for the needle is calculated based on the relative bearing of the simulated aircraft with respect to the simulated transmitter apparatus and the signal strength of the signal from the simulated transmitter apparatus from step 67. In step 69, the needle position is modified based on inputted codes (i.e., inputted into the simulator) related to various search and rescue conditions that may be encountered by a search and rescue team (e.g., simulated missions from table 1).

If in step 59 the simulated transmitting apparatus is determined to be located in front of the simulated aircraft (i.e., simulated transmitter apparatus positioned 90° or less to the left or right from front of simulated aircraft), then in step 64 an actual needle position for the needle is calculated based on the relative bearing of the simulated aircraft with respect to the simulated transmitter apparatus and the signal strength of the signal from the simulated transmitter apparatus from step 67. In step 69, the needle position is modified based on inputted codes (i.e., inputted into the simulator) related to various search and rescue conditions that may be encountered by a search and rescue team (e.g., simulated missions from table 1).

Figure 5:
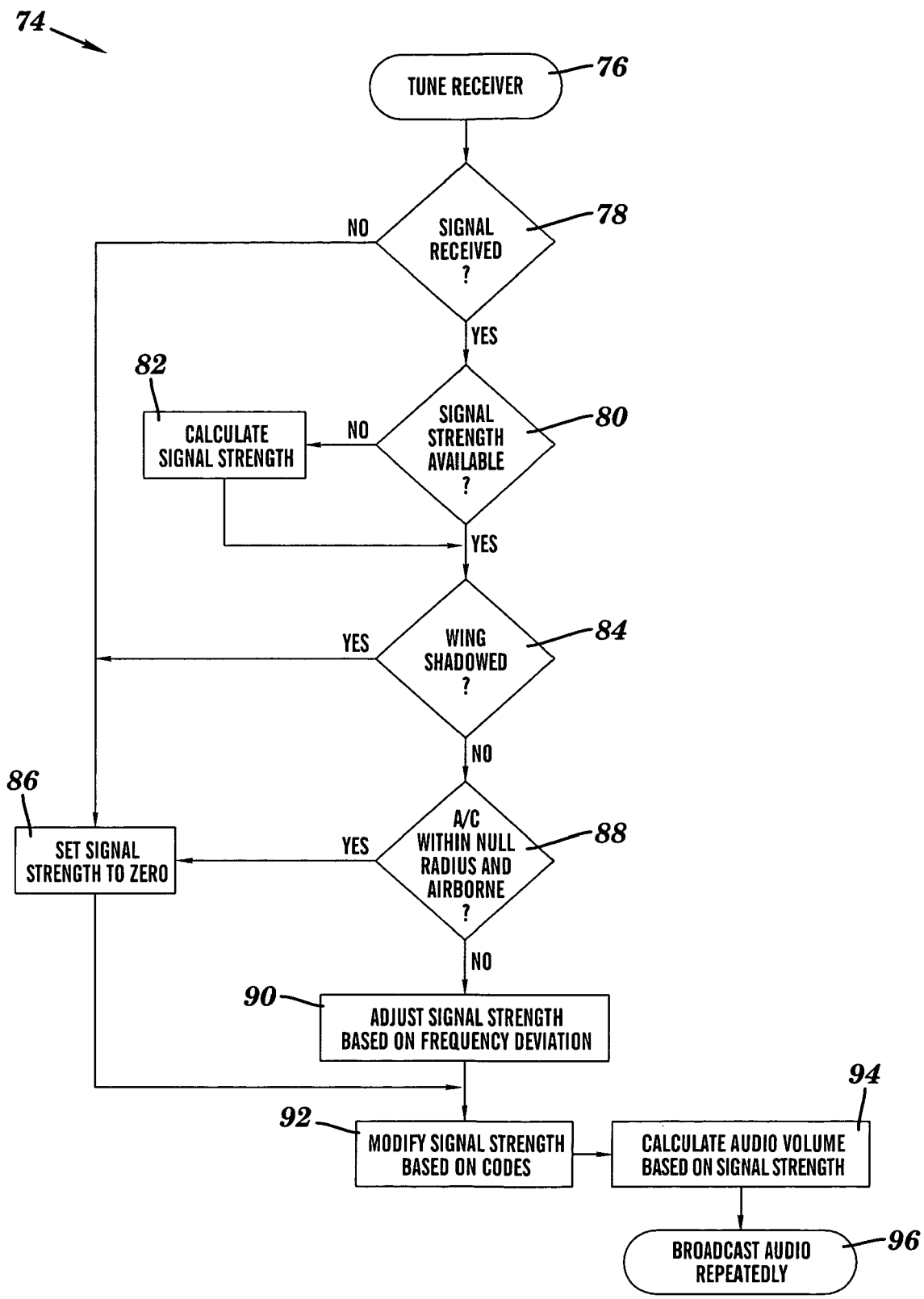
FIG. 5 is a flowchart depicting an algorithm illustrating a functionality for using an audio component of the signal (i.e., an audio signal) transmitted from the transmitting apparatus of FIG. 6 illustrates a computer system used for implementing the aircraft search and rescue simulator of the present invention.

FIG. 5 is a flowchart depicting an algorithm 74 illustrating a functionality for using an audio component of the signal (i.e., an audio signal) transmitted from the transmitting apparatus 7 of FIG. 2 for locating the transmitting apparatus within the simulator 2 of FIG. 1, in accordance with embodiments of the present invention. In step 76, a user activates the simulator and tunes (e.g., using the frequency selection knob 14 of FIG. 2) a receiving apparatus to a specified receiving frequency (i.e., frequency to receive the signal being transmitted from the transmitting apparatus 7 of FIG. 1). Alternatively, the user may enter coordinates for an approximate location of the transmitting apparatus into the receiving apparatus. For example, if the simulation exercise comprises a search and rescue operation for a downed aircraft, approximate coordinates for the crash site may be entered into the receiving apparatus. Additionally, approximate coordinates may be entered into the receiving apparatus and when the simulated aircraft (e.g., see FIG. 1) reaches the approximate coordinates, the receiving apparatus may be tuned to a specified receiving frequency (i.e., frequency to receive the signal being transmitted from the transmitting apparatus 7) to assist the user in locating the transmitting apparatus. In step 78, the simulator determines whether the signal being transmitted from the transmitting apparatus is received by the receiving apparatus.

If the signal transmitted from the transmitting apparatus is not received by the receiving apparatus in step 78, then the simulator will reset itself (e.g. the signal strength gauge 28 of FIG. 2 will be reset to zero) in step 86 and in step 92 codes related to various search and rescue conditions that may be encountered by a search and rescue team (e.g., simulated missions from table 1) may be entered into the simulator to produce a signal comprising a signal strength related to a simulated mission. In step 94, a volume for the audio signal is calculated based on a signal strength of the signal. In step 96, the audio signal is broadcast for the user at the calculated volume.

If the signal transmitted from the transmitting apparatus is received by the receiving apparatus in step 78, then in step 80 the simulator determines if an associated value for a signal strength for the signal is available. If an associated value for the signal strength is not determined in step 80, then an associated value for the signal strength is calculated in step 82 and the simulator determines in step 84 if the signal is blocked due to wing shadowing. If an associated value for the signal strength is determined in step 80 then likewise the simulator determines if the signal is blocked due to wing shadowing in step 84.

If the signal is blocked due to wing shadowing in step 84, then the simulator will reset itself (e.g. the signal strength gauge 28 of FIG. 2 will be reset to zero) in step 86 and in step 92 codes related to various search and rescue conditions that may be encountered by a search and rescue team (e.g., simulated missions from table 1) may be entered into the simulator to produce a signal strength related to a simulated mission and in step 92 codes related to various search and rescue conditions that may be encountered by a search and rescue team (e.g., simulated missions from table 1) may be entered into the simulator to produce a signal comprising a signal strength related to a simulated mission. In step 94, a volume for the audio signal is calculated based on a signal strength of the signal. In step 96, the audio signal is broadcast for the user at the calculated volume.

If the signal is not blocked due to wing shadowing in step 84, then in step 88 the simulator determines if the simulated aircraft (e.g., simulated aircraft 11 of FIG. 1) is within a null radius (i.e., the simulated aircraft fuselage is blocking the signal). If in step 88, the simulator determines that the simulated aircraft (e.g., see FIG. 1) is within a null radius, then go to steps 86, 92, 94, and 96 respectively as described, supra. If in step 88, the simulator determines that the simulated aircraft (e.g., see FIG. 1) is not within a null radius, then the signal strength may be adjusted by a frequency step off as described in the description of FIG. 2 and the algorithm 74 completes steps 92, 94, and 96 respectively as described, supra.

Figure 6:
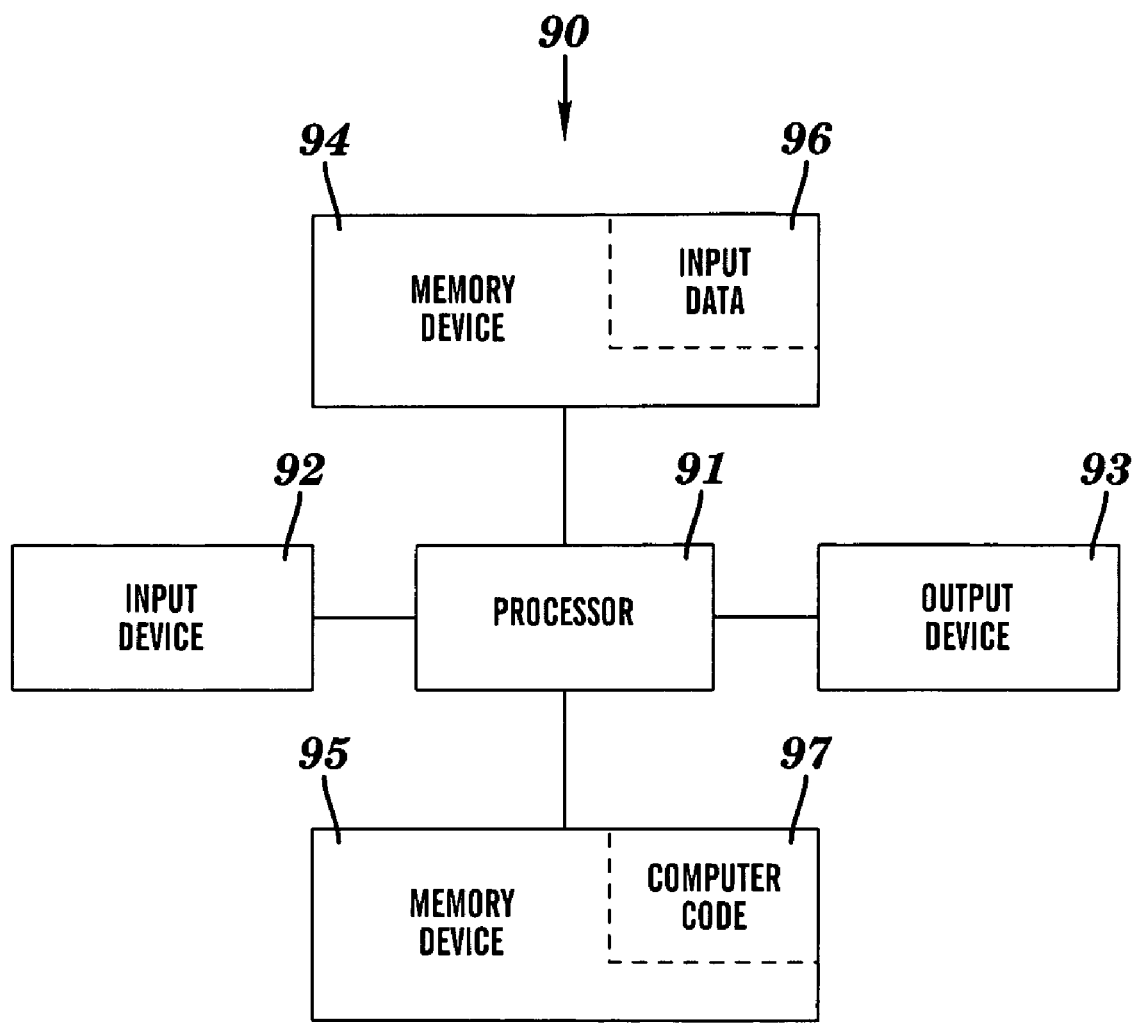

FIG. 6 illustrates a computer system 90 used for implementing the aircraft search and rescue simulator 2 of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithm (s) for implementing the aircraft search and rescue simulator 2 of the present invention for transmission. The processor 91 executes the computer code 97. The memory device 94 includes input data 9. The memory device 94 memory device 95, and the processor 91 may relate to the computing device 1 of FIG. 1. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer program product for training simulation, comprising:
    a computer readable, tangible storage device;
    first program instructions for generating a simulated aircraft in flight performing a search and rescue function, wherein said simulated aircraft in flight performing said search and rescue function is displayed on a computer monitor, and wherein said simulated aircraft in flight comprises a vehicular control panel;
    second program instructions for generating a simulated environment, wherein said simulated environment is displayed on said computer monitor;
    third program instructions for generating a simulated receiver apparatus within the vehicular control panel, wherein said simulated receiver apparatus is displayed on said computer monitor, wherein said simulated receiver apparatus comprises a simulated aircraft direction finding (DF) apparatus; and
    fourth program instructions for generating a simulated transmitter apparatus within the simulated environment, wherein said simulated transmitter apparatus is displayed on said computer monitor, wherein said simulated transmitter apparatus is programmed to generate and transmit a simulated signal, wherein said simulated receiver apparatus is programmed to receive said simulated signal, wherein said simulated transmitter apparatus comprises a simulated emergency locator transmitter (ELT), and wherein said simulated aircraft in flight is programmed to be maneuvered to place said simulated aircraft in flight between said simulated signal and said DF apparatus to block said simulated signal from said DF apparatus to enable said user to locate said simulated transmitter apparatus in said simulated environment, wherein the first program instructions, the second program instructions, the third program instructions, and the fourth program instructions are stored on the computer readable, tangible storage device for execution by a central processing unit of a computer.

2. The computer program product of claim 1, wherein said simulated aircraft DF apparatus comprises signal strength adjustment program instructions for adjusting a signal strength of said received signal.

3. The computer program product of claim 1, wherein said simulated aircraft DF apparatus comprises frequency selection program instructions for selecting a receiving frequency for said simulated receiver apparatus.

4. The computer program product of claim 3, wherein said frequency selection program instructions are adapted programmed to enable said user to locate said simulated transmitter apparatus in said simulated environment by incrementally adjusting said receiving frequency.

5. The computer program product of claim 1, wherein said signal comprises an audio signal, and wherein said simulated aircraft DF apparatus comprises audio broadcasting program instructions for broadcasting said audio signal to enable said user to locate said simulated transmitter apparatus in said simulated environment by allowing said user to listen to an audio strength of said audio signal and maneuver said simulated aircraft in flight according to said audio strength in order to locate said simulated transmitter apparatus.

6. The computer program product of claim 1, wherein said simulated aircraft DF apparatus comprises an indication gauge for indicting to the user a direction of the simulated transmitter apparatus in relation to the simulated aircraft.

7. The computer program product of claim 1, wherein said first program instructions, said second program instructions, said third program instructions, and said fourth program instructions are each a software program instructions.

8. The computer program product of claim 1, wherein said simulated environment comprises simulated weather conditions.

9. The computer program product of claim 1, wherein said simulated receiver apparatus comprises a way point mark activation button for updating a current latitude and longitude for said simulated aircraft.

10. The computer program product of claim 9, wherein said way point mark activation button increments a search and rescue way point ID number.

11. The computer program product of claim 1, wherein said simulated receiver apparatus comprises a frequency selection knob for allowing a user to select a broadcast frequency.

12. The computer program product of claim 11, wherein said broadcast frequency is selected from a range of about 121 MHz to about 122 MHz.

13. The computer program product of claim 1, wherein the simulated transmitter apparatus comprises simulation program code for simulating that said simulated aircraft is located near high voltage power lines.

14. The computer program product of claim 1, wherein said simulated aircraft in flight is programmed to be maneuvered to enable a wing shadowing process to use a wing of said simulated aircraft to block said simulated signal from said DF apparatus.

15. The computer program product of claim 1, wherein said simulated aircraft in flight is programmed to be maneuvered to use a fuselage of said simulated aircraft to block said simulated signal from said DF apparatus.

16. The computer program product of claim 1, further comprising:
    simulating program code for simulating a partial malfunction of said receiving apparatus.

17. The computer program product of claim 1, wherein said simulated receiver apparatus is programmed to receive codes related to various search and rescue conditions associated with simulated missions.

18. The computer program product of claim 1, wherein said simulated aircraft in flight is a simulated airplane in flight.

19. A training simulation method, comprising:
    a computer displaying a software training simulator on a computer monitor, the software training simulator displaying a simulated aircraft in flight performing a search and rescue function within a simulated environment, the software training simulator comprising;
    a simulated transmitter apparatus transmitting a simulated signal, the simulated transmitter apparatus located within the simulated environment, the simulated transmitter apparatus comprising a simulated emergency locator transmitter (ELT);
    a simulated receiver apparatus receiving said transmitted simulated signal, the simulated receiver apparatus located within the simulated aircraft, the simulated receiver apparatus comprising a simulated aircraft direction finding (DF) apparatus comprising a DF gauge; and said simulated aircraft in flight being maneuvered to place said simulated aircraft in flight between said simulated signal and said DF apparatus to block said simulated signal from said DF apparatus to enable said user to locate said simulated transmitter apparatus in said simulated environment.

20. The method of claim 19, further comprising:
program code within said simulated aircraft DF apparatus, adjusting a signal strength of said received signal in response to user input.

21. The method of claim 19, further comprising:
program code changing a receiving frequency for said simulated receiver apparatus in response to user input.

22. The method of claim 21, further comprising incrementally adjusting said receiving frequency to enable said user to locate said simulated transmitter apparatus in said simulated environment.

23. The method of claim 19, wherein said signal comprises an audio signal, wherein said simulated aircraft DF apparatus comprises an audio broadcasting means for broadcasting said audio signal, and wherein the method further comprises:
the user listening to the audio signal; and
the user manuvering the simulated aircraft in flight according to an audio strength of said audio signal in order to locate said simulated transmitter apparatus.

24. The method of claim 19, further comprising:
a gauge indicating to the user, a direction of the simulated transmitter apparatus in relation to the simulated aircraft.

25. The method of claim 19, wherein said simulated environment comprises simulated weather conditions.

26. The method of claim 19, further comprising:
a way point mark activation button within said simulated aircraft DF apparatus, updating a current latitude and longitude for said simulated aircraft.

27. The method of claim 26, wherein said way point mark activation button increments a search and rescue way point ID number.

28. The method of claim 19, further comprising:
a frequency selection knob within said simulated aircraft DF apparatus, selecting a broadcast frequency.

29. The method of claim 19, further comprising:
said simulated aircraft DF apparatus simulating that said simulated aircraft is located near high voltage power lines.

30. A computer system for implementing a training simulator, said computer system comprising:
a central processing unit;
a computer readable memory;
a computer readable, tangible storage device;
first program code for providing within a software implemented training simulator, a simulated vehicle in motion performing a search and rescue function within a simulated environment, a simulated receiver apparatus within the simulated vehicle, and a simulated transmitter apparatus within the simulated environment, wherein said simulated vehicle in motion is a simulated aircraft in flight, wherein said simulated transmitter apparatus comprises a simulated emergency locator transmitter (ELT), and wherein said simulated receiver apparatus comprises a simulated aircraft direction finding (DF) apparatus comprising a DF gauge;
second program code for displaying by said processor, said training simulator on a computer monitor associated with said computer system;
third program code for transmitting by the simulated transmitter apparatus, a simulated signal;
fourth program code for receiving by the simulated receiver apparatus, said transmitted simulated signal;
fifth program code for maneuvering by the user, said simulated aircraft in flight to place said simulated aircraft in flight between said signal and said DF apparatus to block said simulated signal from said DF apparatus to enable said user to locate said simulated transmitter apparatus in a simulated environment,
wherein the first program code, the second program code, the third program code, the fourth program code, and the fifth program code are stored on the computer readable, tangible storage device for execution by the central processing unit via the computer readable memory.

31. The computer system of claim 30, further comprising:
program code within said simulated aircraft DF apparatus for adjusting a signal strength of said received signal in response to user input.

32. The computer system of claim 30, further comprising:
program code within said simulated aircraft DF apparatus for receiving frequency for said simulated receiver apparatus in response to user input.

33. The computer system of claim 32, further comprising program code for incrementally adjusting said receiving frequency to assist said user in locating said simulated transmitter apparatus in said simulated environment.

34. The computer system of claim 30, wherein said signal comprises an audio signal, wherein said simulated aircraft DF apparatus comprises audio broadcasting program code for broadcasting said audio signal, wherein the user listens to the audio signal, and wherein the user maneuvers the simulated aircraft in flight according to an audio strength of said audio signal in order to locate said simulated transmitter apparatus.

35. The computer system of claim 30, further comprising:
a gauge indicating to the user, a direction of the simulated transmitter apparatus in relation to the simulated aircraft.

* * * * *